United States Patent [19]

Bronstert et al.

[11] Patent Number: 4,663,406
[45] Date of Patent: May 5, 1987

[54] CATALYST SYSTEMS FOR THE CATIONIC POLYMERIZATION OF ISOBUTYLENE

[75] Inventors: Klaus Bronstert, Carlsberg; Waldhelm Hochstein, Freinsheim; Heinrich Mohr, Frankenthal; Gerhard Sandrock, Frankenthal; Hans-Henning Vogel, Frankenthal; Hans P. Rath, Gruenstadt, all of Fed. Rep. of Germany

[73] Assignee: BASF Aktiengesellschaft, Fed. Rep. of Germany

[21] Appl. No.: 836,649

[22] Filed: Mar. 5, 1986

[30] Foreign Application Priority Data

Mar. 15, 1985 [DE] Fed. Rep. of Germany ....... 3509272

[51] Int. Cl.$^4$ ............................................... C08F 4/14
[52] U.S. Cl. .................................... 526/204; 526/237
[58] Field of Search ....................... 526/204, 237, 238

[56] References Cited

U.S. PATENT DOCUMENTS 4,391,959 7/1983 Fauth ..................................... 526/70
4,568,732 2/1986 Kennedy ............................. 526/237

FOREIGN PATENT DOCUMENTS 1361429 7/1974 United Kingdom .
1363310 8/1974 United Kingdom .

*Primary Examiner*—Paul R. Michl
*Attorney, Agent, or Firm*—Keil & Weinkauf

[57] ABSTRACT

Isobutylene polymers are prepared by polymerizing the monomers at from 0.2 to 20 bar and from $-130°$ and $+60°$ C. in the presence of from 0.01 to 20 mmol of a boron halide catalyst system which contains as cocatalyst a carboxylic anhydride or carbonyl halide, preferably an aliphatic or aromatic, unsubstituted or halogen-substituted $C_4$–$C_{18}$-carboxylic anhydride of $C_2$–$C_{12}$-carbonyl halide and where appropriate also a customary polymerization accelerant in customary amounts, in the presence or absence of an inert solvent with dissipation of the heat of reaction.

3 Claims, No Drawings

CATALYST SYSTEMS FOR THE CATIONIC POLYMERIZATION OF ISOBUTYLENE

The present invention relates to a process for preparing isobutylene polymers by homopolymerizing isobutylene or copolymerizing isobutylene with olefinically unsaturated compounds which are copolymerizable with isobutylene, in liquid phase in a polymerization zone in which a pressure of from 0.2 to 20 bar and a temperature of from $-130°$ to $+60°$ C. prevail in the presence of from 0.01 to 20 mmol per mol of starting monomer of a boron halide catalyst and in the presence of a catalyst and where appropriate a polymerization accelerant, the molar ratio of boron halide to the cocatalyst and where appropriate to the polymerization accelerant being in each case from 0.5 to 200, and in the presence of from 0 to 90% by weight, based on the weight of the mixture of monomer and solvent, of a solvent which is inert under reaction conditions, with dissipation of the heat of polymerization by cooling.

With such polymerization processes carried out with the use of boron halide catalysts, it is necessary to carry out the reaction in the presence of a cocatalyst and where appropriate in addition in the presence of reaction-accelerating compounds, so that not only is the molecular weight of the resulting polymers to be increased but also the course of reaction to be accelerated and the amount of catalyst to be reduced. It is further of interest industrially to carry out the polymerization of isobutylene in liquid phase with dissipation of the heat of polymerization by cooling.

It is already known to attempt to meet these requirements by catalyzing the polymerization of isobutylene with a boron halide catalyst in the presence of a cocatalyst and to speed up the reaction by working in the presence of a reaction-accelerating compound (cf. Monograph by H. Güterbock, "Polyisobutylen und Isobutylen-Misch-polymerisate", Springer-Verlag, Berlin/Göttingen/Heidelberg, 1959, pages 87 to 91, and British Patent Nos. 828,367 and 525,542). Suitable cocatalysts are in particular orthocarboxylate esters such as triethyl orthoformate, carboxamides such as dimethylacetamide, amino compounds such as dimethylaniline or methyl-substituted quinolines or formaldehyde, and suitable polymerization accelerants are primary and secondary alcohols such as propanols, butanols, benzyl alcohol, etc. (cf. British Patent Nos. 1,361,429 and 1,363,310). In the known processes, the polymerization is usually carried out in inert solvents, for example in ethylene, and the heat of polymerization can be dissipated by evaporative cooling (cf. for example U.S. Pat. No. 4,391,959).

However, the known processes have the disadvantage that only a very small portion of the boron trifluoride used leads to polymerization and the added "accelerants" have a pronounced regulating effect on the molecular weight. For instance, increasing consumption of trifluoride generally goes hand in hand with a higher fluorine content in the resulting polymer. This fluorine, which is in some instances thermally labile, creates in particular corrosion problems in further processing.

It is an object of the present invention to find a catalyst system which has a low regulating effect with respect to the resulting molecular weight of the isobutylene polymer and leads to polymerization with high molecular weights and low boron halide consumption.

We have found that this object is achieved according to the invention by the processes claimed in claims 1, 2 and 3.

Processes for preparing isobutylene polymers by homopolymerization or copolymerization of isobutylene have been known as such for some time and are described for example in detail in the references cited at the beginning. Suitable olefinically unsaturated compounds which are copolymerizable with isobutylene are in particular but-1-ene, but-2-ene, 4-methylpent-1-ene, styrene, alkyl-substituted styrenes, propylene and isoprene. An extensive list of compounds which are copolymerizable with isobutylene in the presence of boron halide catalyst is contained in the previously mentioned monograph by H. Güterbock, so that there is no need for further description. The isobutylene copolymers obtained where appropriate usually contain from 0.1 to 25% by weight of comonomers as copolymerized units, but it is also possible for larger amounts of comonomers to be present in the copolymer. The process according to the invention is preferably restricted to the homopolymerization of isobutylene. The homopolymers have the formula

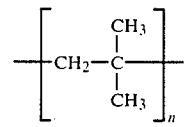

where n is from 9 to 9000, preferably from 13 to 4000. The above polyisobutylenes having weight average molecular weights $M_w$ of from 500 to 480,000, preferably from 800 to 300,000, in particular from 500 to 5000, as determined by viscosity measurements in accordance with DIN 51 562 or ASTM-D 1601, are oily, viscous or elasto-meric at room temperature, depending on the molecular weight, and have a density of from 0.83 to 0.93 g/cm$^3$ by DIN 53 479.

They are of versatile utility as sealants, contact adhesives or viscosity improvers and as an intermediate to lubricant oil additives in engine oils.

The homopolymerization or copolymerization of isobutylene is effected in liquid phase, advantageously in the absence of air. To this end, the polymerization is carried out either in solution in the presence of a suitable solvent or in liquid isobutylene itself, the excess isobutylene acting as solvent. In the latter case, the maintenance of the liquid phase may make it advisable to employ a pressure of up to 20 bar.

In industry it is customary to use for the preparation of isobutylene polymer in polymerization zones apparatuses which are equipped with devices for mixing the monomer alone or in solution with the catalyst as such or in solution and for cooling for the purpose of conducting away the heat of polymerization. They operate batchwise, semicontinuously or continuously. An overview of the customary processes is given by H. Güterbock loc. cit., pages 91 et seq. Preferably the polymerization zone is constructed as a tubular reactor or ribbon polymerizer, which has a length of from 0.5 to 800 m and, for better heat dissipation, a relatively narrow internal diameter of from 0.1 to 10 cm (cf. EP-A1-16 312). For practical reasons it is advantageous to coil the tube in the form of a spiral and to place it in a cooling bath. To enlarge the heat exchange area it is also possible to use a tube bundle.

The polymerization to isobutylene polymers is carried out under a pressure of from 0.2 to 20, preferably from 0.7 to 10, bar and at temperatures of from −130° to 60° C., preferably from −110° to +20° C. Such pressure and temperature settings are customary, so that further explanation is superfluous.

The catalysts used for initiating the isobutylene homopolymerization or copolymerization are boron halides, in particular $BCl_3$ and $BF_3$. It is particularly advantageous to use boron trifluoride, $BF_3$, which can be prepared industrially by heating boric anhydride, fluorspar, sulfuric acid and oleum in a cast iron stirred vessel (cf. British Patent No. 324,016). It is also possible to use a purified boron trifluoride (cf. U.S. Pat. No. 4,391,959). The amount of boron halide, preferably boron trifluoride, used per mole of the monomer used, for example in the homopolymerization per mole of isobutylene, is from 0.01 to 20 millimoles (mmol), preferably from 0.1 to 5 millimoles. The use of boron halide catalysts in the polymerization of isobutylene is customary and long known.

When boron halides, in particular boron trifluoride, are used as catalysts in the polymerization of isobutylene to high-molecular polymers, it is possible to employ various organic compounds as catalyst aids. Such additives are referred to as cocatalysts, because they can influence the molecular weight and raise the rate of polymerization. Known cocatalysts, in addition to the types of compounds mentioned at the beginning, are compounds such as organic sulfides, carbon sulfide, organic ethers such as alkyl or isopropyl ether, isopropyl acetate, methyl propyl ketone, etc. (cf. H. Güterbock, "Polyisobutylen und Isobutylen-Mischpolymerisate", Springer-Verlag Berlin/Göttingen/Heidelberg, 1959, page 88). The cocatalysts are used in such amounts that the molar ratio of boron halide to cocatalyst is from 0.5 to 200, preferably from 1.0 to 100.

In addition to using boron halide catalysts and cocatalysts it is customarily also possible to carry out the polymerization of isobutylene in the presence of polymerization accelerants, which speed up the reaction and effect a reduction in the amount of catalyst and in the molecular weight. The compounds used for this purpose, in addition to those mentioned at the beginning, are mineral oil acids, organic carboxylic acids, formaldehyde, water, etc. (cf. monograph by H. Güterbock, page 87). In the process according to the invention, preferred polymerization accelerants are water, alcohols and phenols, such as isobutanol, propanols, benzyl alcohol, phenol or cresol, but in particular isobutanol. The polymerization accelerants are used, if appropriate, in such amounts that the molar ratio of boron halide to polymerization accelerant is from 0.5 to 200, preferably from 1.0 to 100. Since the cocatalysts likewise affect the polymerization of isobutylene with respect to the molecular weight, the polymerization accelerants are only present in the catalyst complex if desired. It is possible to dispense with polymerization accelerant if higher amounts of catalyst or cocatalyst are acceptable.

The polymerization of isobutylene can be carried out in the presence of from 0 to 90% by weight, based on the weight of the mixture of monomer and solvent, of a solvent which is substantially inert under reaction conditions. Particularly suitable solvents are $C_4$–$C_6$-alkanes or mixtures thereof with $C_4$–$C_6$-alkenes. If a solvent is used, an amount of from 30 to 80% by weight is preferred.

The polymerization of isobutylene gives rise to a very substantial heat of reaction, which needs to be dissipated either by internal or external cooling or by evaporative cooling in a conventional manner.

In the process according to the invention, the cocatalyst used is a carboxylic anhydride or carbonyl halide. Preference is given to an aliphatic or aromatic, unsubstituted or halogen-substituted $C_4$–$C_{18}$-carboxylic anhydride or to an aliphatic or aromatic, unsubstituted or halogen-substituted $C_2$–$C_{12}$-carbonyl halide. Such compounds are so well known from organic chemistry that description of the preparation is superfluous. Particularly preferred cocatalysts are the compounds acetic anhydride, trifluoroacetic anhydride, trichloroacetic anhydride, benzoic anhydride, phthalic anhydride, succinic anhydride, pivalic anhydride, maleic anhydride, (meth)acrylic anhydride or acetyl fluoride, acetyl chloride, acetyl bromide, benzoyl chloride, pivaloyl chloride or acryloyl chloride. Preferably the molar ratio of boron halide to cocatalyst is from 1.1 to 100.

Since water, alcohols and acids can decompose or modify the carboxylic anhydrides and carbonyl chlorides, they should be removed from the starting materials before the polymerization either completely or except for the desired amount of accelerant. The catalyst system can be added as a completed system or be produced in the monomer directly for the polymerization. However, it is advisable to carry out the polymerization with the catalyst systems being prepared in situ, since the complexes are in some instances sparingly soluble solids.

It is advantageous to use a molar excess of boron halide for the polymerization. Preference is given to a molar ratio of boron halide:anhydride of from 1.1 to 100, but molar ratios of from 0.5 and 200 are likewise practicable. When the molar ratio is less than 1.1, the amount of catalyst required rises steeply. The molecular weight of the polymers obtained can be controlled over wide ranges by means of the amount and molar ratio of the catalyst system. For instance, at 0° C. it is possible to obtain molecular weights of from 500 to 5000. The amount of boron halide necessary for those molecular weights ranges from 0.01 to 20 mmol per mol of isobutylene.

The advantages obtained with the invention are in particular that in the preparation of low-molecular isobutylene polymers of molecular weights of from 500 to 5000, it is possible to obtain polymers having a low oligomer content. A further advantage is the low consumption of boron halide; economic advantages also result from the possibility of conducting the polymer synthesis at temperatures not as low as customary. It is also an advantage that in the process according to the invention the mean polymerization time can be limited to from 5 to 120 seconds.

EXAMPLES 1 TO 6

To test the catalyst systems for productivity and regulating action, a mixture of equal parts of but-2-ene and isobutylene is polymerized in a tubular reactor of 10 m length and an internal diameter of 3 mm at 20° C. and 3.5 bar with $BF_3$, is let down and is neutralized by adding 0.1 mmol of acid anhydride and 0.1 mmol of isobutanol per mol of isobutylene and then forcing the mixture by means of $BF_3$ through a mixing nozzle into the tubular reactor. The amount of butene added is 6 kg/h and the amount of $BF_3$ is 1.0 mmol/mol of isobutylene. The reactor is cooled with water at 20° C., and the residence time is 30″. Termination is effected at the end of the tubular reactor by letting down and washing with dilute sodium hydroxide solution. The uncoverted liquid gas is condensed at $-80°$ C. and analyzed for isobutylene; the polyisobutylene is freed from oligomers at 200° C. and 3 mbar; and the viscosity of the residual oil is determined. The conversion is a measure of the productivity and the viscosity a measure of the reactivity and the regulating action of the catalyst system.

| Example | Additive | Conversion % by weight | Viscosity $mm^2/S$ (by ASTM-D 445) |
|---|---|---|---|
| 1 | Acetic anhydride | 99 | 170 |
| 2 | Trifluoroacetic anhydride | 97 | 285 |
| 3 | Maleic anhydride | 99 | 350 |
| 4 | Acetyl chloride | 90 | 265 |
| 5 | Benzoic anhydride | 95 | 425 |
| 6 | Pivalic anhydride | 96 | 480 |

We claim:

1. A process for preparing isobutylene polymers by homopolymerizing isobutylene or copolymerizing isobutylene with olefinically unsaturated compounds which are copolymerizable with isobutylene, in liquid phase in a polymerization zone in which a pressure of from 0.2 to 20 bar and a temperature of from $-130°$ to $+60°$ C. prevail in the presence of from 0.01 to 20 mmol per mol of starting monomer of a boron halide catalyst and in the presence of a cocatalyst and where appropriate of a polymerization accelerant, the molar ratio of boron halide to the cocatalyst and where appropriate to the polymerization accelerant being in each case from 0.5 to 200, and in the presence of from 0 to 90% by weight, based on the weight of the mixture of monomer and solvent, of a solvent which is inert under reaction conditions, with dissipation of the heat of polymerization by cooling which comprises using as the cocatalyst a carboxylic anhydride or carbonyl halide.

2. A process as claimed in claim 1, wherein the cocatalyst used is an aliphatic or aromatic, unsubstituted or halogen-substituted $C_4$–$C_{18}$-carboxylic anhydride or $C_2$–$C_{12}$-carbonyl halide.

3. A process as claimed in claim 1, wherein the cocatalyst used is acetic anhydride, trifluoroacetic anhydride, trichloroacetic anhydride, benzoic anhydride, phthalic anhydride, succinic anhydride, pivalic anhydride, maleic anhydride, (meth)acrylic anhydride or acetyl fluoride, acetyl chloride, acetyl bromide, benzoyl chloride, pivaloyl chloride or acryloyl chloride.

* * * * *

UNITED STATES PATENT AND TRADEMARK OFFICE
CERTIFICATE OF CORRECTION

PATENT NO. : 4,663,406
DATED : May 5, 1987
INVENTOR(S) : Klaus BRONSTERT et al.

It is certified that error appears in the above-identified patent and that said Letters Patent is hereby corrected as shown below:

In the Abstract:

2nd line:

. . . and from $-130°$ [and] should be to

Signed and Sealed this

Fifteenth Day of September, 1987

*Attest:*

DONALD J. QUIGG

*Attesting Officer*    *Commissioner of Patents and Trademarks*